US008312432B2

(12) United States Patent
Mori

(10) Patent No.: US 8,312,432 B2
(45) Date of Patent: Nov. 13, 2012

(54) METHOD OF ADJUSTING TIMING DIFFERENCE BETWEEN PRE-CORRECTED SOURCE PROGRAM AND POST-CORRECTED SOURCE PROGRAM, COMPILER AND INFORMATION PROCESSOR

(75) Inventor: Kenji Mori, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1100 days.

(21) Appl. No.: 12/232,005

(22) Filed: Sep. 9, 2008

(65) Prior Publication Data

US 2009/0083713 A1 Mar. 26, 2009

(30) Foreign Application Priority Data

Sep. 25, 2007 (JP) ................................. 2007-246641

(51) Int. Cl.
*G06F 9/44* (2006.01)
(52) U.S. Cl. ........ 717/127; 717/140; 717/143; 717/148; 717/153
(58) Field of Classification Search ........... 717/127–167
See application file for complete search history.

(56) References Cited

U.S. PATENT DOCUMENTS

| | | | |
|---|---|---|---|
| 5,193,190 A * | 3/1993 | Janczyn et al. | 717/156 |
| 6,345,384 B1 * | 2/2002 | Sato | 717/160 |
| 2003/0154469 A1 * | 8/2003 | Anderson et al. | 717/161 |
| 2005/0071825 A1 * | 3/2005 | Nagaraj et al. | 717/142 |
| 2007/0055961 A1 * | 3/2007 | Callister et al. | 717/136 |

FOREIGN PATENT DOCUMENTS

JP 2002-323981 11/2002

OTHER PUBLICATIONS

Park et al., Experiments With A Program Timing Tool Based On Source-Level Timing Schema, IEEE, 1990, pp. 72-81.*
Healy et al., Integrating the Timing Analysis of Pipelining and Instruction Caching, IEEE, 1995, pp. 288-297.*
Desoli et al., DELI A New Run-Time Control Point, IEEE, 2002, pp. 257-268.*

* cited by examiner

*Primary Examiner* — Anna Deng
*Assistant Examiner* — Satish Rampuria
(74) *Attorney, Agent, or Firm* — McGinn IP Law Group, PLLC

(57) ABSTRACT

A method of adjusting a control timing accompanying a program correction of a machine language program executed by an information processor includes preparing a first machine language program obtained by compiling a first source program and generating a second intermediate language program from a second source program, the second source program being corrected from the first source program. Then, the method computes a first number of clock cycles, that is a number of clock cycles to execute a first machine language program obtained by compiling the first source program and computes a second number of clock cycles, that is a number of clock cycles to execute a second machine language program obtained by compiling the second source program, using the second intermediate language program, the second intermediate language program including an instruction that is uniquely correlated with a machine language instruction of the second machine language program.

6 Claims, 15 Drawing Sheets

FIG. 4

PRE-CORRECTION SOURCE CODE (3a):

```
main(void)
[
    MEM1 = MEM1 + MEM2:

MEM3 = MEM3 + MEM4:

IF(MEM1 = MEM3)
    [
        MEM1 = MEM3:
    ]
    ELSE
    [
        MEM3 = MEM1:
    ]
    MEM2 = 0:
    MEM4 = 0:
]
```

PRE-CORRECTION INTERMEDIATE LANGUAGE CODE (6):

```
main:
        LD      REG0,   #MEM2
        LD      REG1,   (REG0)
        LD      REG2,   #MEM1
        LD      REG2,   (REG0)
        ADD     REG1,   REG2
        LD      (REG0), REG1
lavel 10:
        LD      REG0,   #MEM4
        LD      REG2,   (REG0)
        LD      REG0,   #MEM3
        PUSH    REG1
        LD      REG1,   (REG0)
        ADD     REG2,   REG1
        LD      (REG0), REG2
        POP     REG1
lavel 11:
        CMP     REG1,   REG2
        JRE     lavel13
lavel 12:
        LD      REG0,   #MEM1
        LD      (REG0), REG2
        JR      lavel14
lavel 13:
        LD      REG0,   #MEM3
        LD      (REG0), REG1
        JR      lavel14
lavel 14:
        LD      REG1,   #0
        LD      REG0,   #MEM2
        LD      (REG0), REG1
        LD      REG0,   #MEM4
        LD      (REG0), REG1
```

27, 28, 29, 30, 31, 32

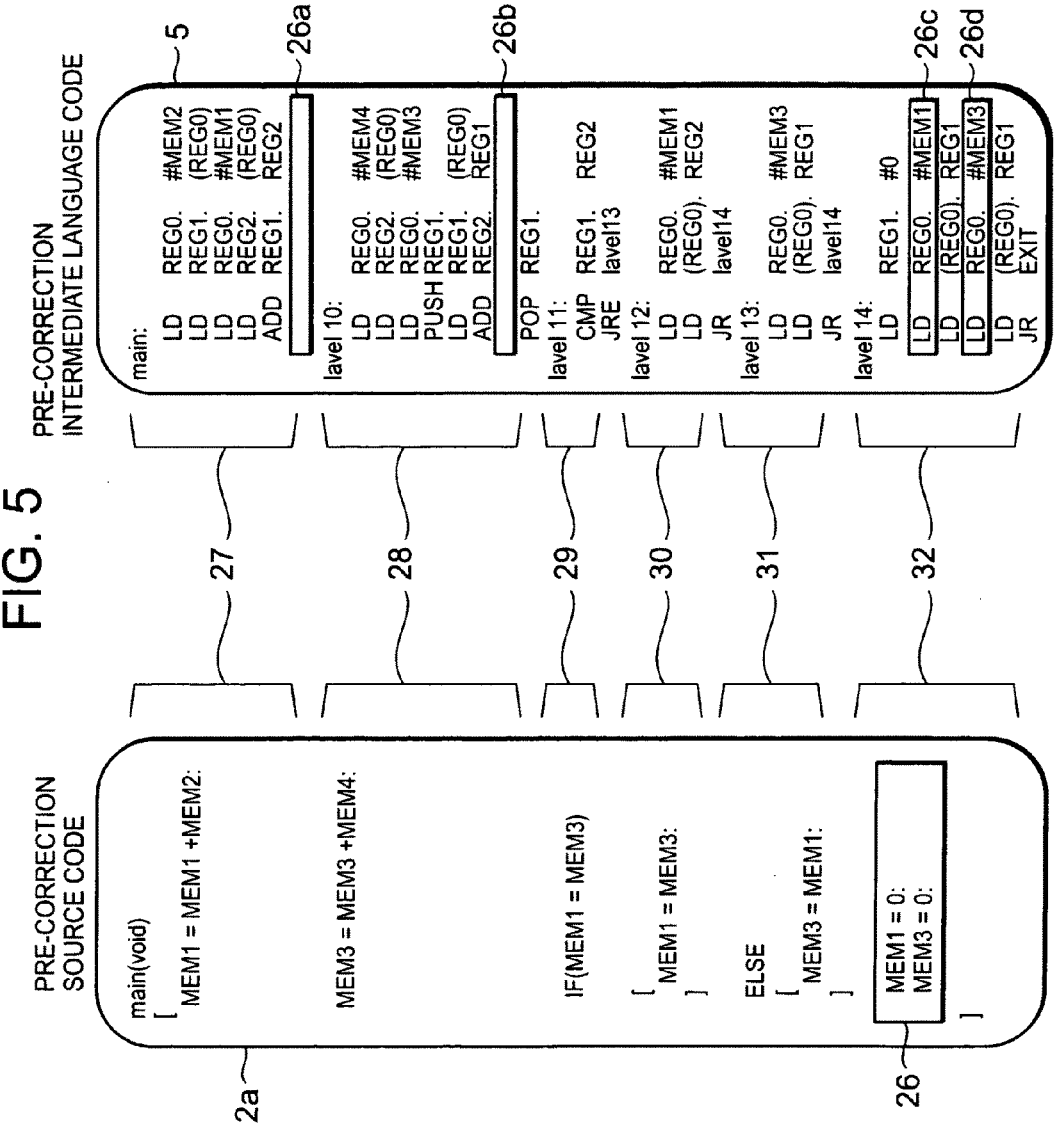

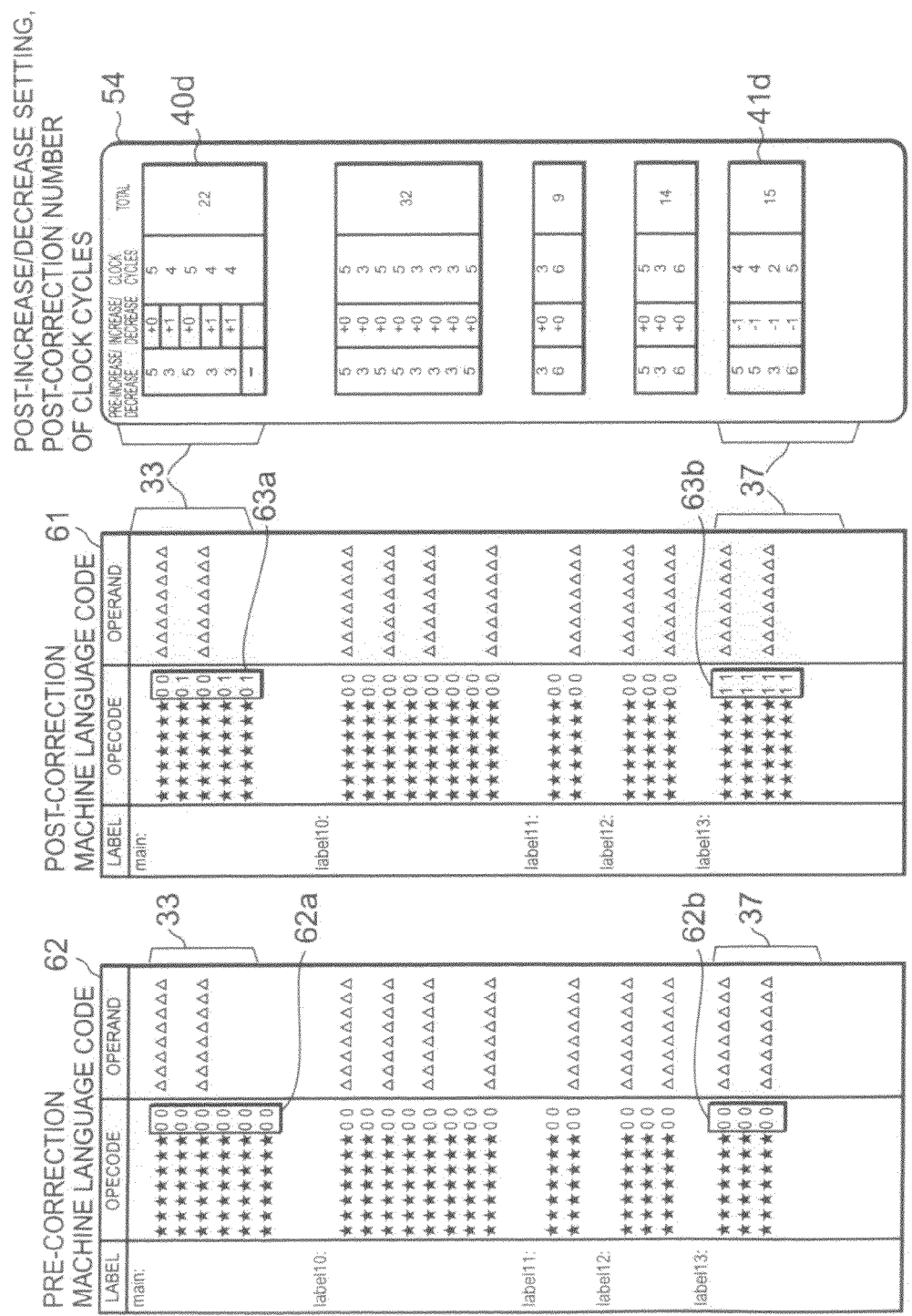

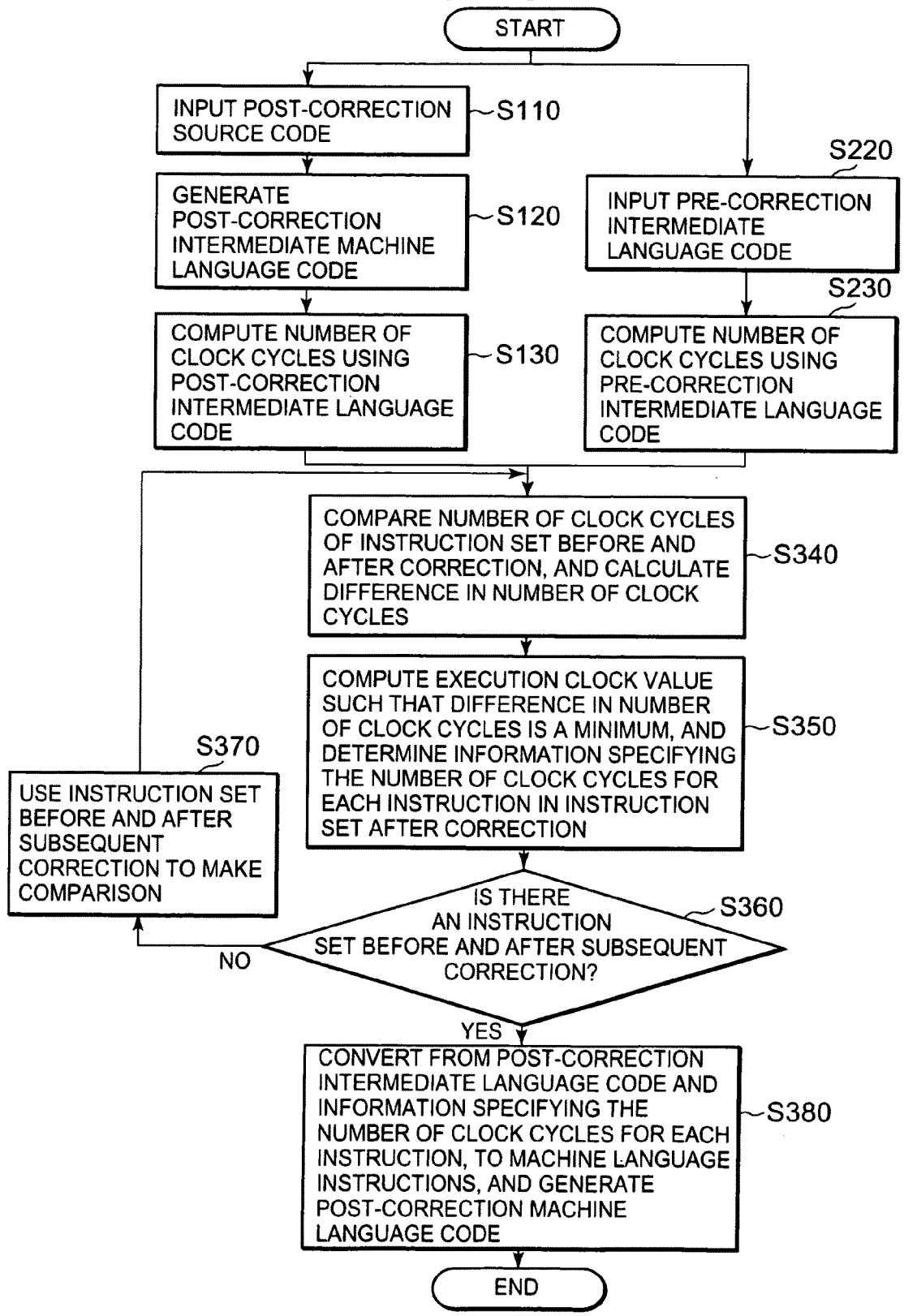

METHOD OF ADJUSTING TIMING DIFFERENCE BETWEEN PRE-CORRECTED SOURCE PROGRAM AND POST-CORRECTED SOURCE PROGRAM, COMPILER AND INFORMATION PROCESSOR

BACKGROUND OF THE INVENTION

1. Field of the Invention

The present invention relates to a control timing adjustment method, a compilation program, a compiler, and an information processor, and in particular relates to a method of adjusting control timing when the compilation program is executed on an information processor.

2. Description of Related Art

In program development, when a fault in a program detected by an inspection process is corrected, the correction is validated not only for the processing which led to the fault, but also for the processing which had been normal up to then, for all the routes that the correction could potentially affect, so as to avoid degradation.

In recent years, in program development of microcomputers for embedded systems, development techniques are mainly being focused on generating a source program with a high level language (for example, C language), and automatically converting it into a target program written in a low level language (for example, assembly language and machine language) by a compiler.

In general, although development techniques using a high level language reduce programming time and can be focused on design, slight program corrections at the high level language level have an effect on plural positions at the low level language level. The runtime of the programming therefore changes very slightly, and this may lead to faults in program operation which could not be anticipated beforehand. It is thus important from the viewpoint of increasing the efficiency of program development, and reuse of programs, to suppress the increase/decrease in program runtime resulting from program correction in this high level language to the minimum.

Hence, in a computer device such as a microcomputer for embedded systems, the output timing (control timing) of the control signal for controlling an internal process or an external instrument may cause a malfunction due to the aforesaid change of program runtime, and it is therefore necessary to adjust the control timing (hereafter, adjustment of control timing will be referred to as control timing adjustment). Control timing adjustment in a process which demands high precision is performed using the hardware timer and interruption function built into the microcomputer. On the other hand, control timing adjustment in a process which does not demand high precision consists of adjusting the program runtime of the microcomputer so that a desired operation is performed by increasing or decreasing execution instructions at the low level language level.

Patent document 1 discloses a control timing adjustment method in high level language development. Here, the control timing adjustment is performed in three stages.

In the first stage, a compiler (or assembler) generates a target program and step number adjustment objects of the target program by a static analysis of the source program. The step number adjustment objects are a group of dummy instructions which are not accompanied by any actual processing and which are added so that the number of instructions (steps) in all branch routes of the target program are equal. In the second stage, a static analysis is performed on the target program using an actual memory by a linker, the step number adjustment objects are corrected, and an executable program which combines the step number adjustment objects is generated. In the third stage, a dynamic analysis is performed on the executable program using an emulator or a simulator, etc., and the step number adjustment objects are corrected. When correction of the step number adjustment objects is performed in the third stage, the executable program which combines the post-correction step number adjustment objects is regenerated, and the dynamic analysis is repeated.

Specifically, in the technique disclosed in Patent document 1, each time the source program is corrected, an executable program is run, i.e., a dynamic analysis is performed. By running the executable program, i.e., a program described by a machine language (hereafter, machine language program), comparing the runtime of the machine language program before and after correction, and repeating the correction of the step number adjustment objects, a machine language program having an adjusted control timing is finally generated.

[Patent document 1] Japanese Laid Open Patent Application Publication No. 2002-323981

SUMMARY OF THE INVENTION

However, in the control timing adjustment method disclosed in Patent document 1, generation of the machine language program having an adjusted control timing takes some time. In the process wherein the above-mentioned machine language is generated, each time the source program is corrected, step number adjustment objects are generated at plural stages and corrected, and in this case, a dynamic analysis must be performed by executing the machine language program. In particular, when the step number adjustment objects are corrected by a dynamic analysis, the executable program which combines adjusted step number adjustment objects must be regenerated, so even more time is required.

As an exemplary aspect of the present invention, a method of adjusting a control timing accompanying a program correction of a machine language program executed by an information processor includes preparing a first machine language program obtained by compiling a first source program and generating a second intermediate language program (for example, a post-correction intermediate language code 5 in this exemplary embodiment of the invention) from a second source program, the second source program being corrected from the first source program (for example, a post-correction source code 2a in this exemplary embodiment of the invention).

Then, the method computes a first number of clock cycles, that is a number of clock cycles to execute a first machine language program obtained by compiling the first source program and computes a second number of clock cycles, that is a number of clock cycles to execute a second machine language program obtained by compiling the second source program, using the second intermediate language program, the second intermediate language program including an instruction that is uniquely correlated with a machine language instruction of the second machine language program.

Then, the second number of clock cycles with the first number of clock cycles are compared, and the second machine language program (for example, a post-correction machine language code 61 in this exemplary embodiment of the invention) is adjusted by performing at least one of addition, deletion and modification of the second machine language program to reduce a difference between the first number of clock cycles and second number of clock cycles, based on the second intermediate language program.

In the above-mentioned control timing adjustment method, the multi-stage adjustment and in particular the dynamic analysis which were performed in the related art are rendered unnecessary, and the time required to generate the machine language program with an adjusted control timing can be reduced. Namely, by using the feature that the intermediate language program generated via a compilation operation from a source program and the number of clock cycles of each instruction of a machine language program can be uniquely correlated, the difference in runtime before and after a correction can be calculated by comparing the number of clock cycles calculated from the intermediate language program deduced from the source program for each instruction set, without executing and comparing the pre-correction machine language program and post-correction machine language program that are respectively generated as executable programs.

The present invention therefore provides a control timing adjustment method that reduces the time required to generate a machine language program for suppressing a change of control timing accompanying program correction.

BRIEF DESCRIPTION OF THE DRAWINGS

The above and other exemplary aspects, advantages and features of the present invention will be more apparent from the following description of certain exemplary embodiments taken in conjunction with the accompanying drawings, in which:

FIG. 4 is a diagram showing an example of a high level language source code before program correction, and an intermediate language code before program correction;

FIG. 5 is a diagram showing a high level language source code after program correction, and an intermediate language code after program correction;

FIG. 14 is a diagram describing the principle whereby a number of clock cycles is increased relative to a machine language code compiled by the compiler 1b according to the second exemplary embodiment of the invention; and FIG. 15 is a flow chart of a control timing adjustment method according to the first exemplary embodiment of the invention.

DETAILED DESCRIPTION OF THE EXEMPLARY EMBODIMENTS

First Exemplary Embodiment

Figure 1:
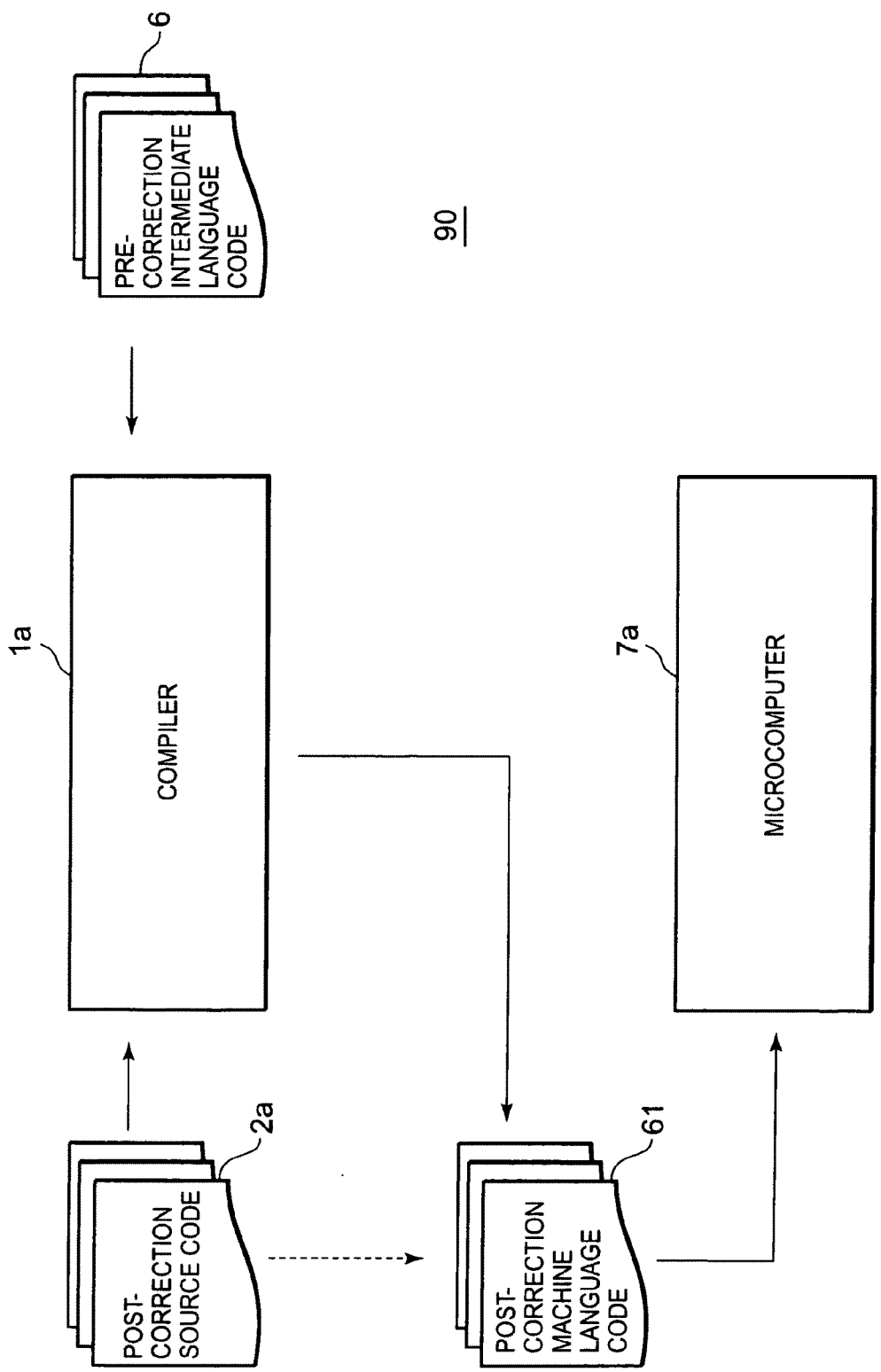
FIG. 1 is a schematic diagram of a control timing adjustment method according to a first exemplary embodiment of the invention.

FIG. 1 is a block diagram showing an outline of a computer system 90 which is an example of an object of the control timing adjustment method according to the first exemplary embodiment of the invention. The computer system 90 has a compiler 1a, microcomputer 7a, post-correction source code 2a, pre-correction intermediate language code 6, and post-correction machine language code 61. Here, an outline of component elements will be described, and the details of component elements will be mentioned later. Hereafter, the program file itself will be referred to as a "code."

The compiler 1a inputs a post-correction source code 2a and pre-correction intermediate language code 6. The compiler 1a changes the post-correction source code 2a into a post-correction intermediate language code (not shown), a number of clock cycles of a pre-correction intermediate language code 6 and post-correction intermediate language code are computed, the difference is calculated, this is taken as an increase value of the number of clock cycles in each instruction, and a post-correction machine language code 61 wherein the increase value of the number of clock cycles is reflected, is generated from the post-correction intermediate language code. The compiler 1a may be any information processor which performs a compilation process that generates a machine language code corresponding to a source code. Alternatively, the compiler 1a may be implemented by executing a compilation program that represents a corresponding process by a program on a computer. The post-correction machine language code 61 is a group of machine language instructions. The post-correction machine language code 61, as well as being converted to machine language instructions by the compiler 1a, is associated with the necessary libraries, and is generated as an executable program that can be executed by the microcomputer 7a. The compiler 1a must convert the instructions of the source code into machine language instructions, but regarding the link process which associates the libraries with the machine language instructions, an ordinary linker may be used separately.

The microcomputer 7a reads the machine language instructions included in the post-correction machine language code 61, and determines an increase value of the number of clock cycles of the machine language instructions, whereupon the machine language instructions in which an increase value of the number of clock cycles is reflected, are executed. This is the control timing adjustment process.

FIG. 15 is a flow chart of the control timing adjustment method in the compiler according to the first exemplary embodiment of the invention. In a Step S110, the post-correction source code which is the object of this control timing adjustment is inputted. In a Step S120, a post-correction intermediate language code is generated from the inputted post-correction source code.

In a Step S130, the number of clock cycles of the instructions is computed using the post-correction intermediate language code. Here, the number of clock cycles obtained from the intermediate language code is correlated with the number of clock cycles of the machine language code obtained by compiling the source code on a 1 to 1 basis. Therefore, even without actually generating the post-correction machine language code, the number of clock cycles can be computed from the intermediate language code. Further, in the Step S130, the number of clock cycles in an instruction set may be computed by summing the number of clock cycles for each instruction of the instruction set, and this is done for each instruction set which is a group process consisting of plural instructions. The post-correction intermediate language code generated in the Step S120 can also be saved separately, and used as a pre-correction intermediate language code after the next correction of the source code.

In parallel with the Steps S110 to S130, Steps S220 and S230 are performed. The processes of the Steps S220 and S230 may be performed before or after the Steps S110 to S130. In the Step S220, a pre-correction intermediate language code is inputted. Here, the pre-correction intermediate language code is an intermediate language code obtained from the pre-correction source code which is used for correction of the source code. In the Step S230, as in the Step S130, a number of clock cycles is likewise computed for each instruction set by computing a number of clock cycles for each instruction, and summing the number of clock cycles of the instructions in the instruction set using the pre-correction intermediate language code. Instead of the Step S220, the pre-correction source code may be inputted as in the Step S110, and the pre-correction intermediate language code generated as in the Step S1120.

In a Step S340, the number of clock cycles of the instruction set before and after correction computed in the Steps S130 and S230 is compared, and the difference in the value of the number of clock cycles is calculated in instruction set units.

In a Step S350, information specifying the number of clock cycles is found for each instruction in the instruction set based on the difference in the value of the number of clock cycles calculated in the Step S340. Here, the information specifying the number of clock cycles is a value for increasing the number of clock cycles of the instruction.

In a Step S360, it is verified whether there is an instruction set before or after the next correction, and when there is, the routine proceeds to a Step S370. When there is not, the routine proceeds to a Step S380. In the Step S370, the instruction set before or after the next correction is taken for comparison, and the processes of the Step S340 to Step S370 are thereafter repeated for all the instruction sets. The processes of the Step S340 to Step S370 may be repeated for each step, or repeated in a different combination.

In the Step S380, the post-correction machine language code is generated from the post-correction intermediate language code and the information specifying the number of clock cycles. In this case, the instructions of the intermediate language code are converted into machine language instructions in which the information specifying the number of clock cycles is reflected.

Specifically, the post-correction machine language code is obtained by modifying the number of clock cycles for a machine language instruction which causes an arbitrary increase in the number of clock cycles as mentioned above, compared to the machine language code converted from the post-correction source code by a prior art compiler function. In the first exemplary embodiment of the invention, an example was shown wherein the number of clock cycles of the post-correction intermediate language code has decreased as compared with the pre-correction intermediate language code. Conversely, when the number of clock cycles of the post-correction intermediate language code has increased as compared with the pre-correction intermediate language code, the routine can be adapted by modifying the machine language instruction itself so as to decrease the number of clock cycles.

In the aforesaid control timing adjustment method, instruction set units were compared and information specifying the number of clock cycles for instruction units was used, but the invention is not limited thereto. For example, instruction units may be compared, and information specifying the number of clock cycles for instruction set units used instead.

Hence, in the control timing adjustment method according to the first exemplary embodiment of the invention, the control timing can be adjusted by performing a single comparison of the intermediate language code before and after correction, without actually executing the machine language program which is an executable program, and without comparing the number of clock cycles at plural stages.

Figure 2:
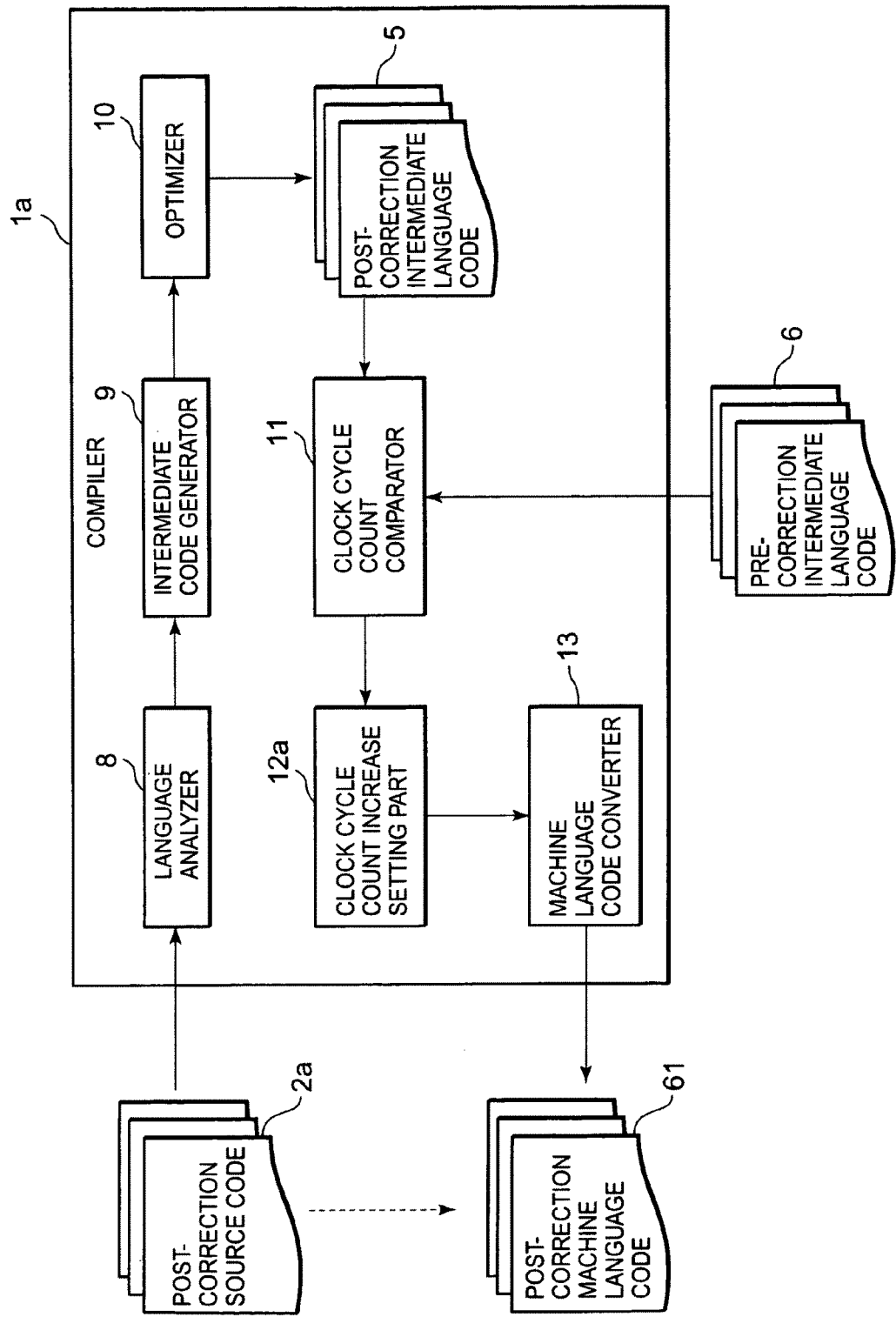
FIG. 2 is a schematic diagram of a compiler 1a according to the first exemplary embodiment of the invention.

FIG. 2 is a block diagram of the compiler 1*a* according to the first exemplary embodiment of the invention.

The compiler 1*a* inputs the post-correction source code 2*a* and pre-correction intermediate language code 6, and generates the post-correction machine language code 61. Specifically, the post-correction source code 2*a* is converted into the post-correction machine language code 61 by the compiler 1*a*.

The compiler 1*a* comprises a language interpreter 8, intermediate code generator 9, optimizer 10, clock cycle count comparator 11, clock cycle count increase setting part 12*a*, and machine language code converter 13.

The post-correction source code 2*a* is converted into the post-correction intermediate language code 5 via the language interpreter 8 which analyzes a high level language source code, the intermediate code generator 9 which temporarily generates an intermediate language code, and the optimizer 10 which optimizes the intermediate language code temporarily generated, so as to generate an optimized intermediate language code. The post-correction intermediate language code 5 is collectively processed together with the pre-correction intermediate language code 6, and is converted into the post-correction machine language code 61 which is an executable program that can be executed by the microcomputer 7*a* via the clock cycle count comparator 11, clock cycle count increase setting part 12*a*, and machine language code converter 13.

The clock cycle count comparator 11, using the post-correction intermediate language code 5 and pre-correction intermediate language code 6, computes the number of clock cycles for each instruction and each instruction set (Steps S130 and S230 of FIG. 15), compares the number of clock cycles for each instruction set of the post-correction intermediate language code 5 and pre-correction intermediate language code 6, and calculates the difference (Step S340 of FIG. 15).

The clock cycle count increase setting part 12*a* obtains the difference calculated by the clock cycle count comparator 11, and computes the increased value of the number of clock cycles for each instruction set by summing the differences of the instructions in the instruction set. The clock cycle count increase setting part 12*a* then determines information specifying the number of clock cycles for each instruction in each instruction set based on the increased value of the computed number of clock cycles (Step S350 of FIG. 15). The processes in the clock cycle count comparator 11 and clock cycle count increase setting part 12*a* are repeated in all the instruction sets (Steps S340 to S370 of FIG. 15).

The machine language code converter 13 converts each instruction of the post-correction intermediate language code 5 into a machine language instruction reflecting information specifying the number of clock cycles, and generates the post-correction machine language code 61 (Step S380 of FIG. 15).

Figure 3:
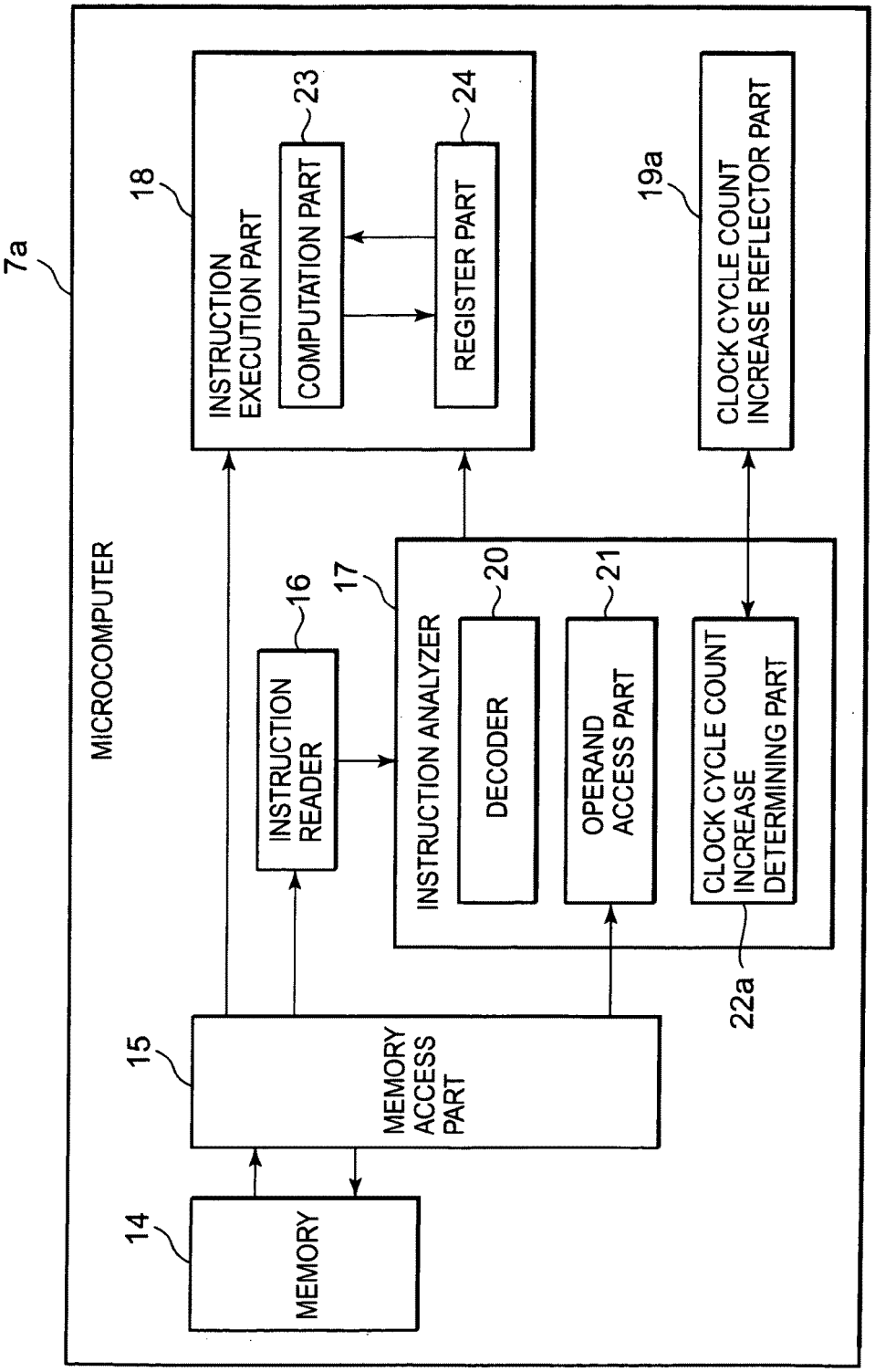
FIG. 3 is a schematic diagram of a microcomputer 7a according to the first exemplary embodiment of the invention.

FIG. 3 is a block diagram of the microcomputer 7a according to the first exemplary embodiment of the invention. The microcomputer 7a has a memory 14, memory access part 15, instruction reader 16, command interpreter 17, clock cycle count increase reflector part 19a, and instruction execution part 18. The command interpreter 17 has a decoder 20, operand access part 21, and clock cycle count increase determining part 22a. The instruction execution part 18 comprises an operation part 23 and a register 24.

Here, the routine whereby the post-correction machine language code 61 generated by the compiler 1a of FIG. 2 is implemented by the microcomputer 7a of FIG. 3, will be described. The post-correction machine language code 61 is stored in the memory 14. The machine language instructions of the post-correction machine language code 61 are read by the instruction reader 16 via the memory access part 15 when the program is executed. An instruction analysis is performed by the command interpreter 17, and implemented by the instruction execution part 18. At this time, regarding a machine language instruction for which an increase in the number of clock cycles was specified by the compiler 1a, information specifying the number of clock cycles is determined by the clock cycle count increase determining part 22a, the number of clock cycles is increased by the clock cycle count increase reflector part 19a, and the instruction is executed by the instruction execution part 18.

Figure 7:
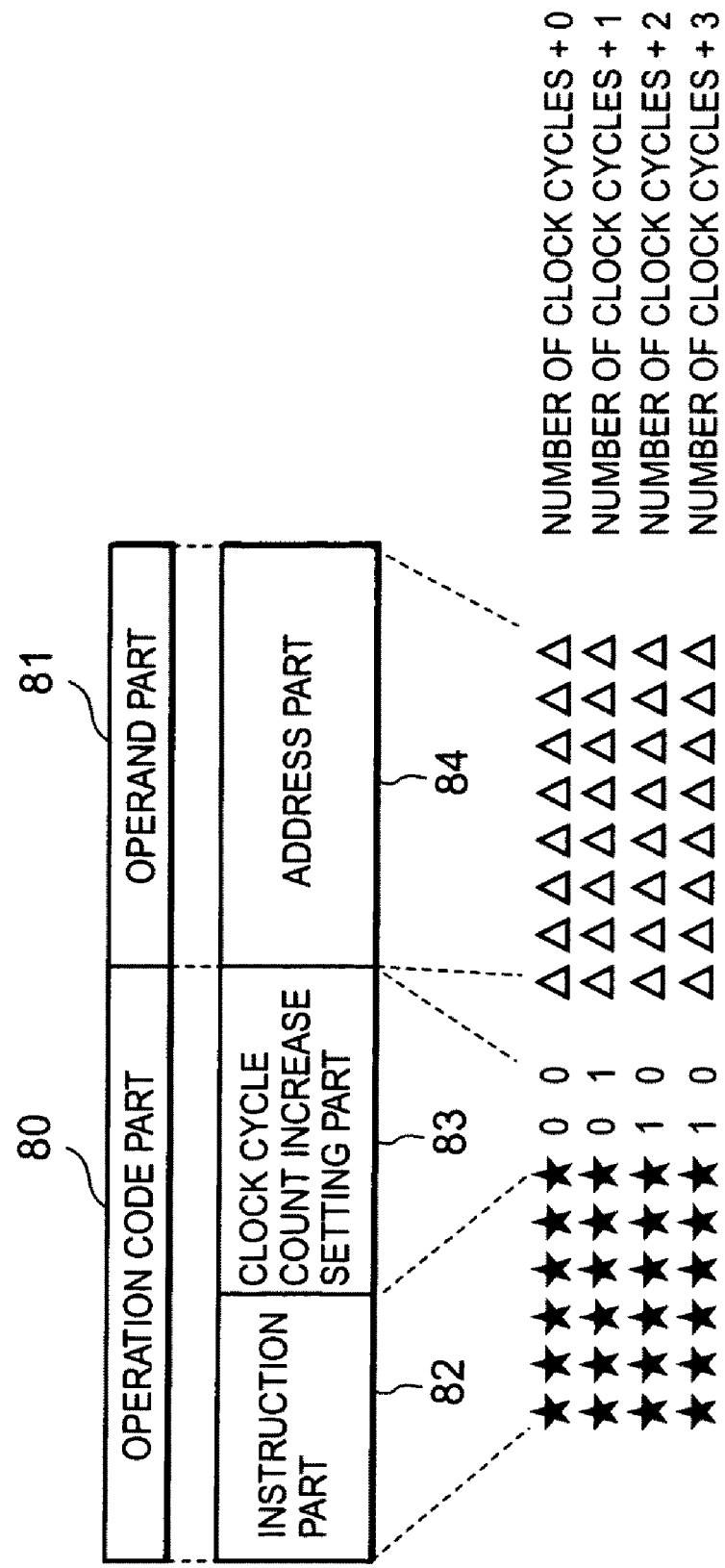
FIG. 7 is a diagram showing the composition of a machine language code of a microcomputer 7a according to the first exemplary embodiment of the invention.

FIG. 7 shows the structure of the machine language code generated by the compiler 1a according to the first exemplary embodiment of the invention which can be processed by the microcomputer 7a. The machine language code according to the first exemplary embodiment of the invention 1 comprises an operation code part 80 and an operand part 81. The operation code part 80 consists of an instruction part 82 showing the contents of an instruction, and a clock cycle count increase specification part 83 specifying the increase in the number of clock cycles (information specifying the number of clock cycles). It is assumed that in the first exemplary embodiment, the information specifying the number of clock cycles is expressed by 2 bits. The information specifying the number of clock cycles has four settings, i.e., 00 to 11, these representing a number of clock cycles from 0 to 3, respectively. Therefore, the clock setting can be increased to 3 by the same instruction (the instruction part is the same). Also, the operand part 81 comprises an address part 84 which is a process object of the instruction part 82.

FIG. 4 shows a pre-correction source code 3a which is a pre-correction program, and an intermediate language code 6 which is an intermediate language code generated by the compiler 1a. Blocks 27 to 32 are instruction sets corresponding to the pre-correction source code 3a and the pre-correction intermediate language code 6.

FIG. 5 shows the post-correction source code 2a which is the program after correction, and the post-correction intermediate language code 5 which is an intermediate language code generated by the compiler 1a. The blocks 27 to 32 are instruction sets corresponding to the post-correction source code 2a and the post-correction intermediate language code 5. The blocks 27 to 32 correspond to FIGS. 4 and 5.

The post-correction source code 2a is obtained by applying a program correction 26 to the block 32 of the pre-correction source code 3a. The post-correction intermediate language code 5 is generated from the post-correction source code 2a by the compiler 1a. FIG. 5 shows that the post-correction intermediate language code 5 is corrected by a program correction 26a of the block 27, a program correction 26b of the block 28, and program corrections 26c, 26d of the block 32. Specifically, it shows that the program corrections 26a, 26b each have one instruction deleted. Also, the program corrections 26c, 26d have been modified by instructions different from the intermediate language code 6 given in FIG. 4.

Figure 6:
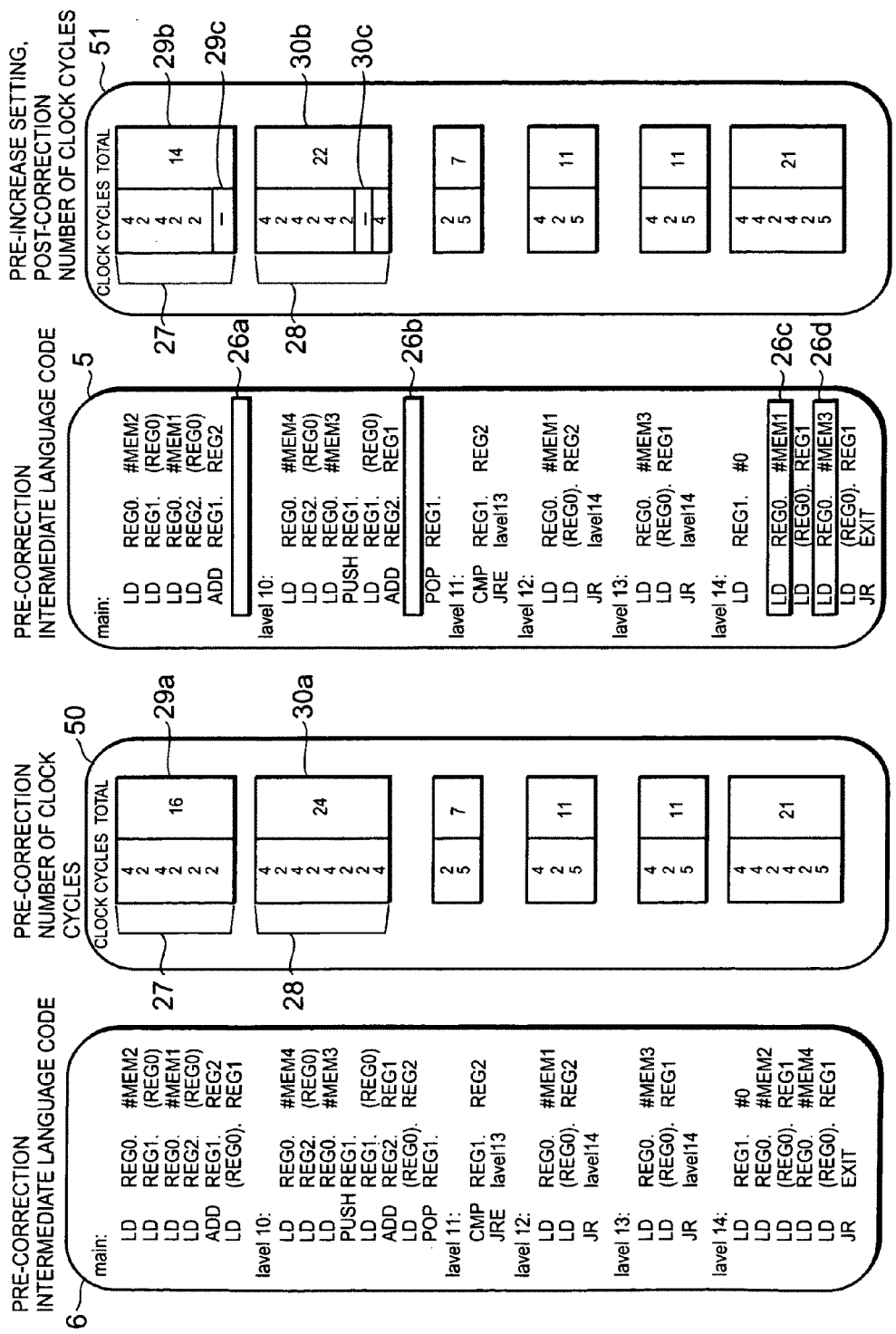
FIG. 6 is a diagram showing a difference between an intermediate language code before and after correction, and a number of clock cycles in a prior art compiler.

FIG. 6 shows the intermediate language code and number of clock cycles when using a prior art compiler before and after program correction. Specifically, FIG. 6 shows the case where the program number of clock cycles of a post-correction program has decreased as compared with the pre-correction program.

Figure 8:
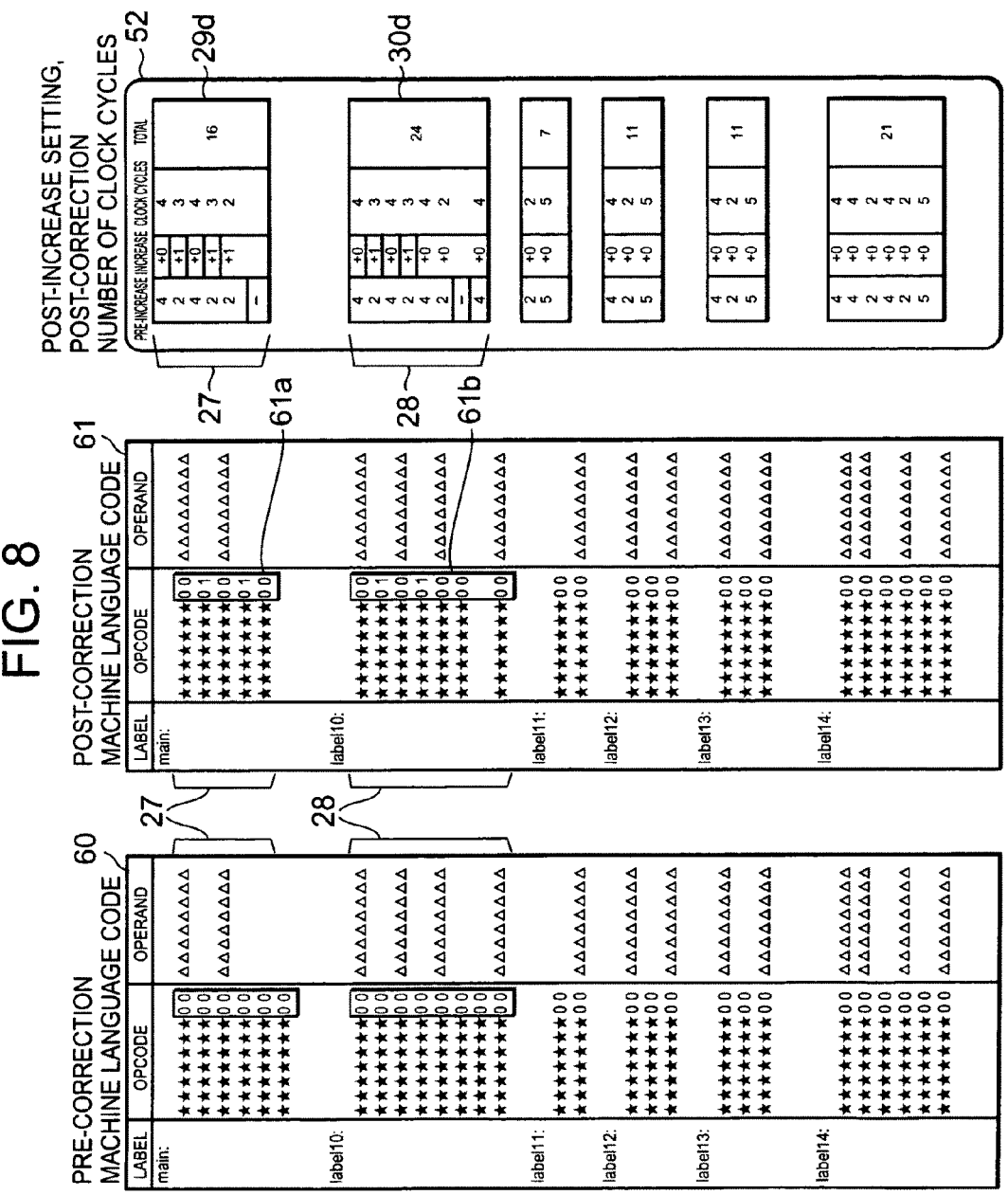
FIG. 8 is a diagram describing a principle whereby a number of clock cycles is increased relative to a machine language code compiled by the compiler 1a according to the first exemplary embodiment of the invention.

FIG. 8 is a descriptive view showing the pre-correction machine language code 60, post-correction machine language code 61 and number of clock cycles after an increase setting. The pre-correction intermediate language code 6 is generated by converting the pre-correction machine language code 60. The post-correction machine language code 61 is generated by converting the post-correction intermediate language code 5. Hereafter, the process whereby the post-correction machine language code 61 is generated from the post-correction intermediate language code 5 will be described in detail.

The clock cycle count comparator 11 of the compiler 1a computes a pre-correction number of clock cycles 50 and a pre-increase, post-correction number of clock cycles 51 of FIG. 6 which are numbers of clock cycles for each instruction and instruction set (block) from the pre-correction intermediate language code 6 and the post-correction intermediate language code 5, and compares the number of clock cycles for each block.

Specifically, for the block 27, the pre-correction number of clock cycles 29a (16) and the post-correction number of clock cycles 29b (14) of FIG. 6 are compared, so the difference is 2 clock cycles (29c). Hence, in the block 27, it is seen that the number of clock cycles has decreased as compared with before correction. Similarly, for the block 28, the pre-correction number of clock cycles 30a (24) and the post-correction number of clock cycles 30b (22) of FIG. 6 are compared, and the difference is likewise 2 clock cycles (30c). Hence, in the block 28, it is seen that the number of clock cycles has decreased as compared with before correction. Due to this, since the program number of clock cycles of the blocks 27 and 28 have changed for the post-correction intermediate language code 5 as compared with the pre-correction intermediate language code 6, the control timing must be adjusted.

Subsequently, the clock cycle count increase setting part 12a of the compiler 1a determines information specifying the number of clock cycles according to the difference in the number of clock cycles calculated by the clock cycle count comparator 11 for each block. Here, the blocks 27 and 28 have decreased by 2 clock cycles, respectively, so in order to reduce this difference, the number of clock cycles is increased by 2 for the instructions of each block. For this purpose, the clock cycle count increase setting part 12a notifies the machine language code converter 13, as information specifying the number of clock cycles, to add one clock cycle each to two instructions of each of the blocks 27 and 28.

Next, the machine language code converter 13 of the compiler 1a converts the instructions of the post-correction intermediate language code 5 into machine language instructions. The machine language code converter 13 sets one clock cycle each in the clock cycle count increase specification parts 61a, 61b (FIG. 8) in two instructions of each of the blocks 27, 28 based on the information specifying the number of clock cycles defined by the clock cycle count increase setting part 12a.

Specifically, the second line and the fourth line of the clock cycle count increase specification part 61a are 01. Similarly, the second line and the fourth line of the clock cycle count increase specification part 61b (FIG. 8) are 01. In this way, the post-correction machine language code 61 is generated by the compiler 1a. Also, the number of clock cycles of the post-correction machine language code 61 executed by the microcomputer 7a is the post-correction number of clock cycles 52 after the increase setting (FIG. 8).

In the pre-correction machine language code 60 generated from the pre-correction source code 3a by a prior art compiler, the number of clock cycles of the blocks 27, 28 is 14 and 22, respectively (29b, 30b of FIG. 6). However, for the post-correction machine language code 61 generated from the post-correction source code 2a by the compiler 1a according to the first exemplary embodiment of the invention, the number of clock cycles is increased as mentioned above, so the blocks 27, 28 of the post-correction number of clock cycles 52 after the increase setting of FIG. 8 are generated as instructions executed by 16 clock cycles and 24 clock cycles in the same way as for the pre-correction machine language code 60, respectively (29d, 30d of FIG. 8). From this it is seen that, although the number of machine language instructions has decreased in blocks 27 and 28, since increased values are set by the clock cycle count increase specification parts 61a, 61b corresponding to the clock cycle count increase specification parts 60a, 60b, the number of clock cycles (29d and 30d) can be made the same as the pre-correction number of clock cycles 29a, 30a, so the difference in the number of clock cycles disappears, and the control timing is thereby adjusted.

The compiler 1a according to the first exemplary embodiment of the invention compares the intermediate language code before and after correction using the feature that the intermediate language code generated during compilation and the number of clock cycles for each instruction of the machine language code are uniquely correlated, respectively, so the difference in program number of clock cycles before and after correction can be found. Hence, there is no need to execute and compare the pre-correction machine language code and post-correction machine language code which are generated as executable programs as in the prior art, and the time required to generate executable programs can be shortened.

In the machine language code used by the microcomputer 7a according to the first exemplary embodiment of the invention, the part that specifies the number of clock cycles contains an operation code part. Therefore, the microcomputer 7a according to the first exemplary embodiment can adjust the instruction number of clock cycles using the increase setting value of the number of clock cycles set by a machine language instruction when the machine language instruction is executed.

Due to this series of operations, the control timing adjustment method according to the first exemplary embodiment of the invention can suppress a change of control timing after a program correction due to code modifications at plural positions of the intermediate language code, resulting from by program correction of a high level language source code, to the minimum.

The increase in the number of clock cycles is specified by clock cycle count increase specification part 83 in the operation code part 80. Therefore, a dummy instruction is not required to adjust the number of clock cycles, and a change of control timing can be suppressed without an increase in program code volume.

In this way, a change of control timing due to correction of program faults (bugs) generated in the final stage (inspection process) of program development, can be suppressed. Therefore, faults accompanying a change of control timing can be prevented, and tests relating to control timing need not be carried out repeatedly.

Also, by the machine language code in the first exemplary embodiment of the invention, the number of clock cycles can be adjusted for instruction sets which differ between the pre-correction intermediate language code and post-correction intermediate language code. Since it is not necessary to increase the number of dummy instructions, excessive increase of program volume can be prevented.

Second Exemplary Embodiment

In the first exemplary embodiment of the invention, an example was shown wherein, when the number of clock cycles has decreased after program correction, the number of clock cycles of the post-correction machine language code is increased.

On the other hand, in a second exemplary embodiment of the invention, an example is shown wherein, by adding a modification to the first exemplary embodiment, when the number of clock cycles has increased after program correction, the number of clock cycles of the post-correction machine language code is decreased to adjust the control timing. Specifically, the second exemplary embodiment can cover an increase or a decrease in the number of clock cycles.

The construction of the computer system which is an example of a device to which the control timing adjustment method according to this embodiment is applied, is identical to that of FIG. 1, and thus diagrams and description thereof are omitted. Also, the flow chart of the control timing adjustment method according to this embodiment is identical to that of FIG. 15, so diagrams and description thereof are omitted. Hereafter, the control timing adjustment method according to the second exemplary embodiment of the invention will be described referring to FIGS. 9 to 14.

Figure 9:
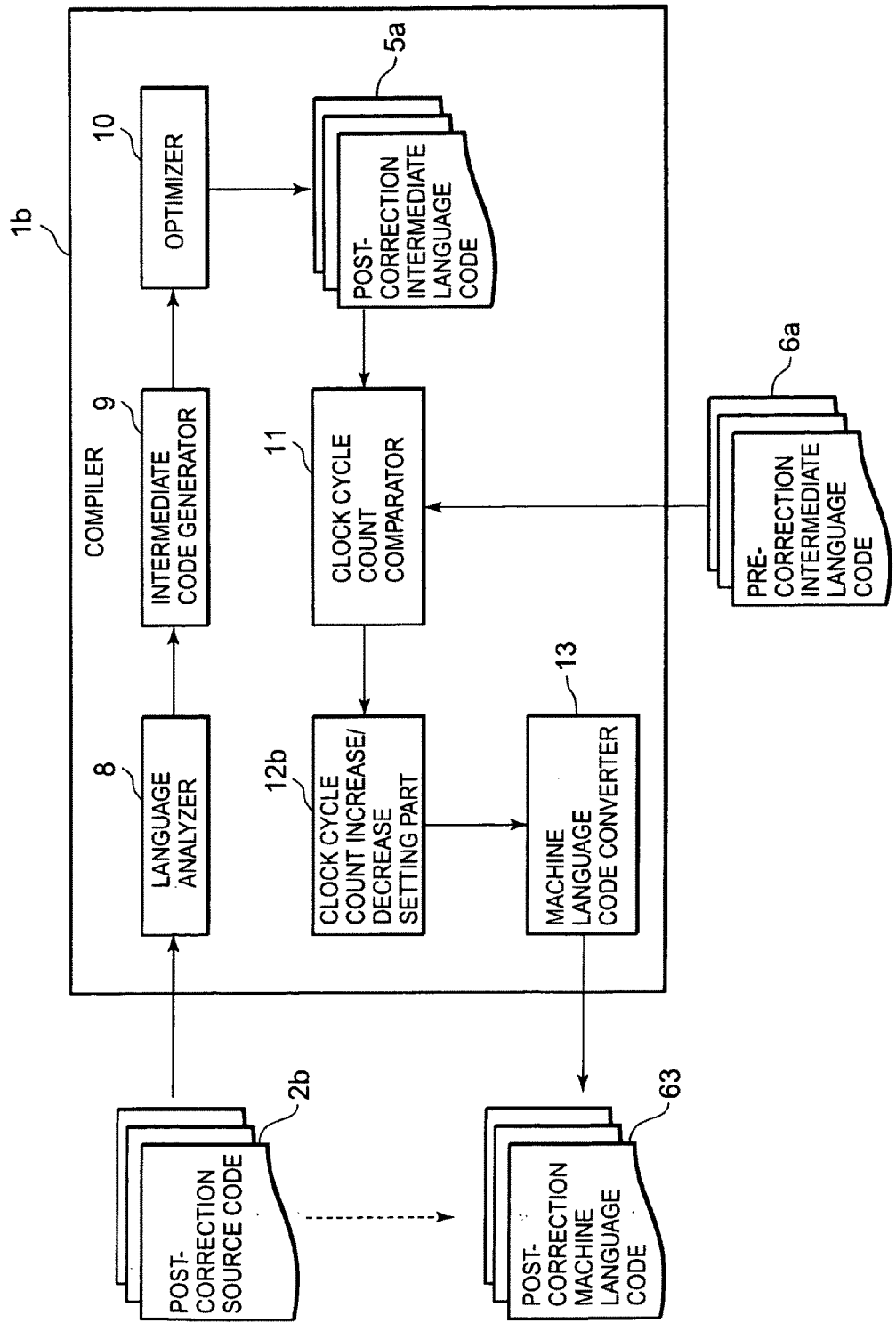
FIG. 9 is a schematic diagram of a compiler 1b according to a second exemplary embodiment of the invention.

FIG. 9 is a block diagram of a compiler 1b according to the second exemplary embodiment of the invention. In the compiler 1b, the clock cycle count increase setting part 12a of the compiler 1a according to the first exemplary embodiment of the invention is replaced by a clock cycle count increase/decrease setting part 12b.

Figure 10:
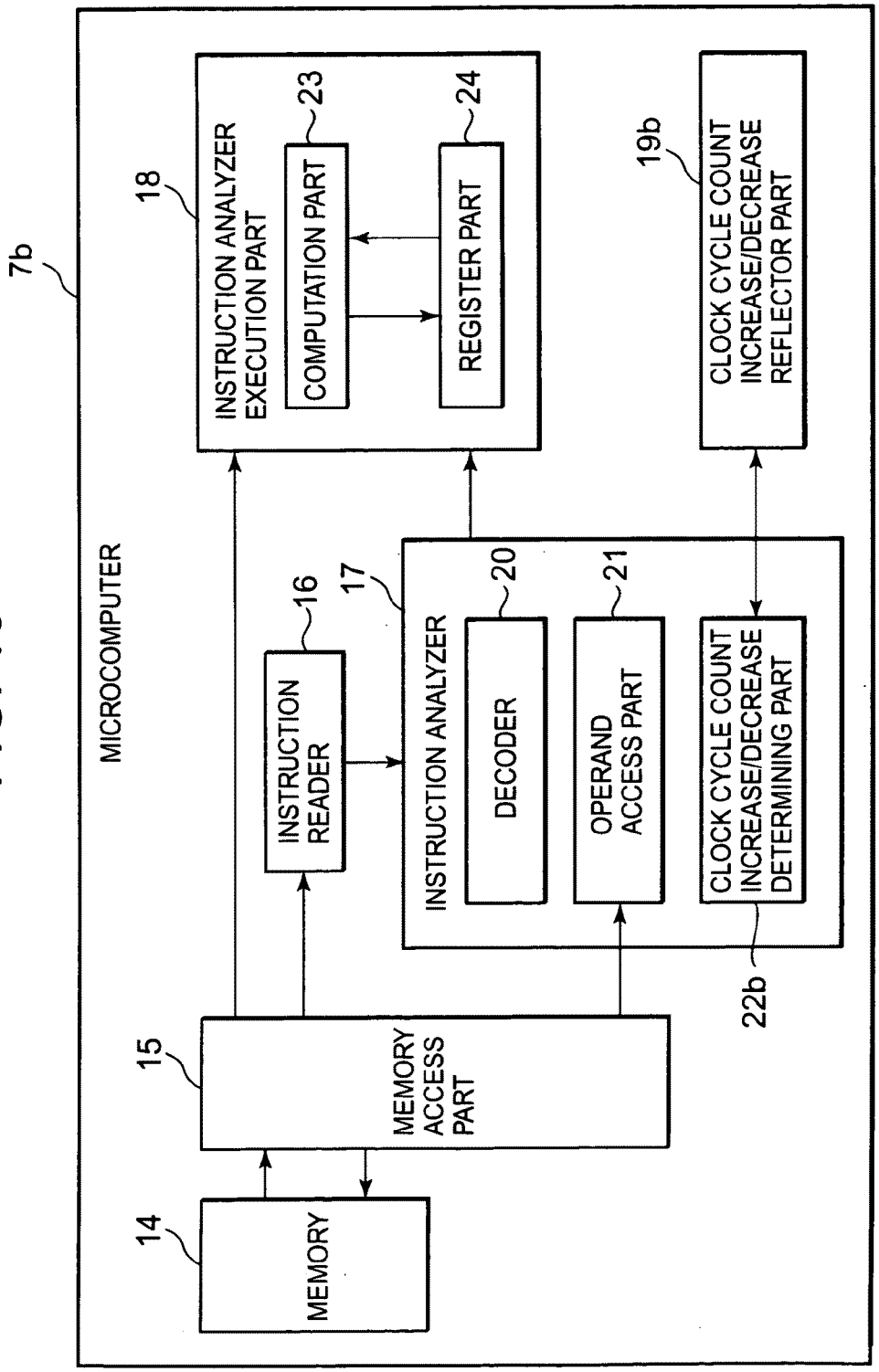
FIG. 10 is a schematic diagram of a microcomputer 7b according to the second exemplary embodiment of the invention.

FIG. 10 is a block diagram of a microcomputer 7b relating to the second exemplary embodiment of the invention. The clock cycle count increase determining part 22a and clock cycle count increase reflector part 19a of the microcomputer 7a according to the first exemplary embodiment of the invention, are respectively replaced by a clock cycle count increase/decrease determining part 22b and clock cycle count increase/decrease reflector part 19b.

Figure 13:
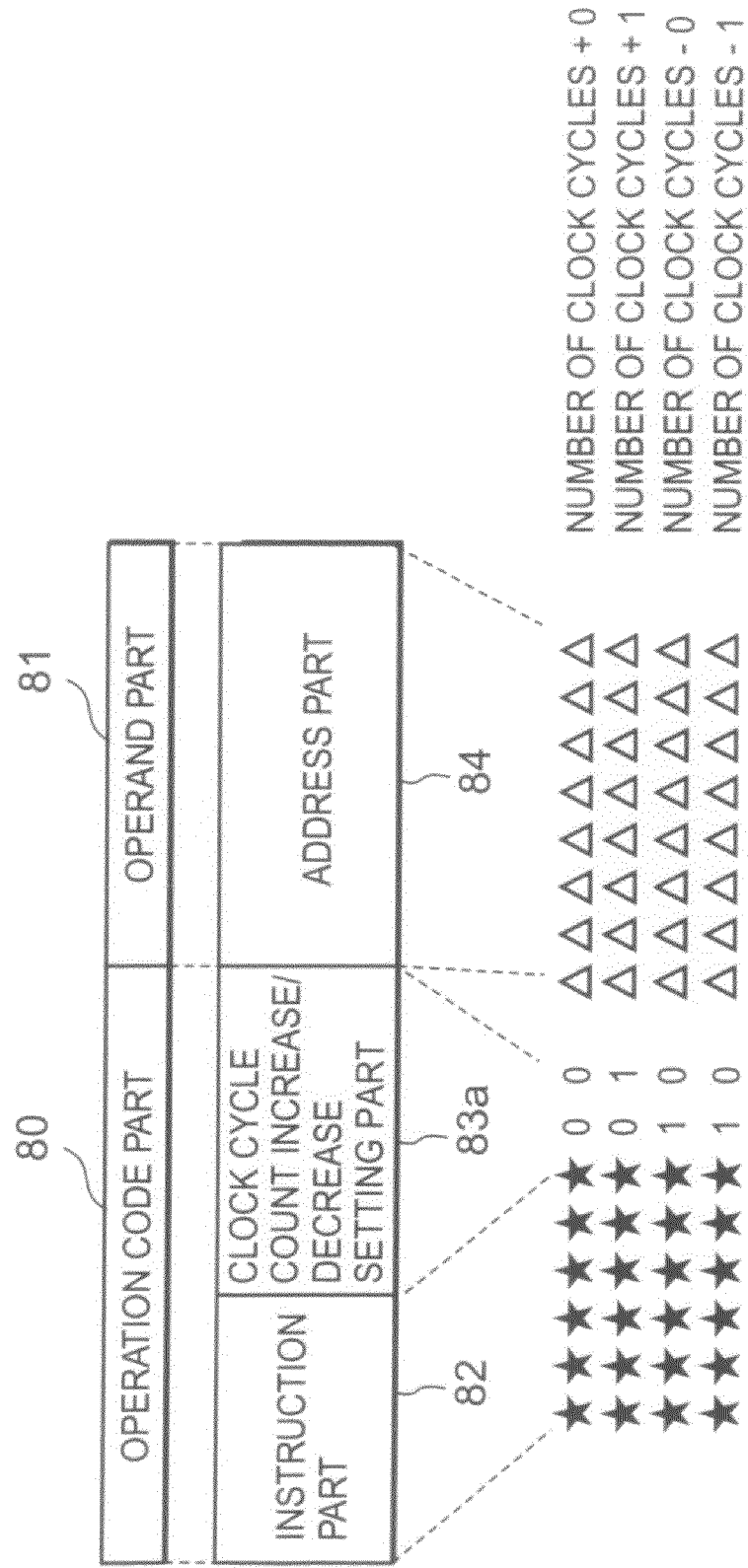
FIG. 13 is a diagram showing the composition of the machine language code of the microcomputer 7b according to the second exemplary embodiment of the invention.

FIG. 13 shows the structure of the machine language code generated by the compiler 1b according to the second exemplary embodiment of the invention which can be processed by the microcomputer 7b. The clock cycle count increase specification part 83 of the machine language code of FIG. 7 according to the first exemplary embodiment of the invention, is replaced by the clock cycle count increase/decrease specification part 83a. In the second exemplary embodiment, as in the first exemplary embodiment of the invention, the information specifying the number of clock cycles is likewise expressed by 2 bits (four patterns from 00 to 11). It will be assumed that the first bit is a symbol wherein 0 represents increase and 1 represents decrease. It will be assumed that the second bit is a correction of the number of clock cycles. Therefore, the clock cycles can be increased/decreased up to ±1 cycle by the same instruction (instruction part is the same).

Figure 11:
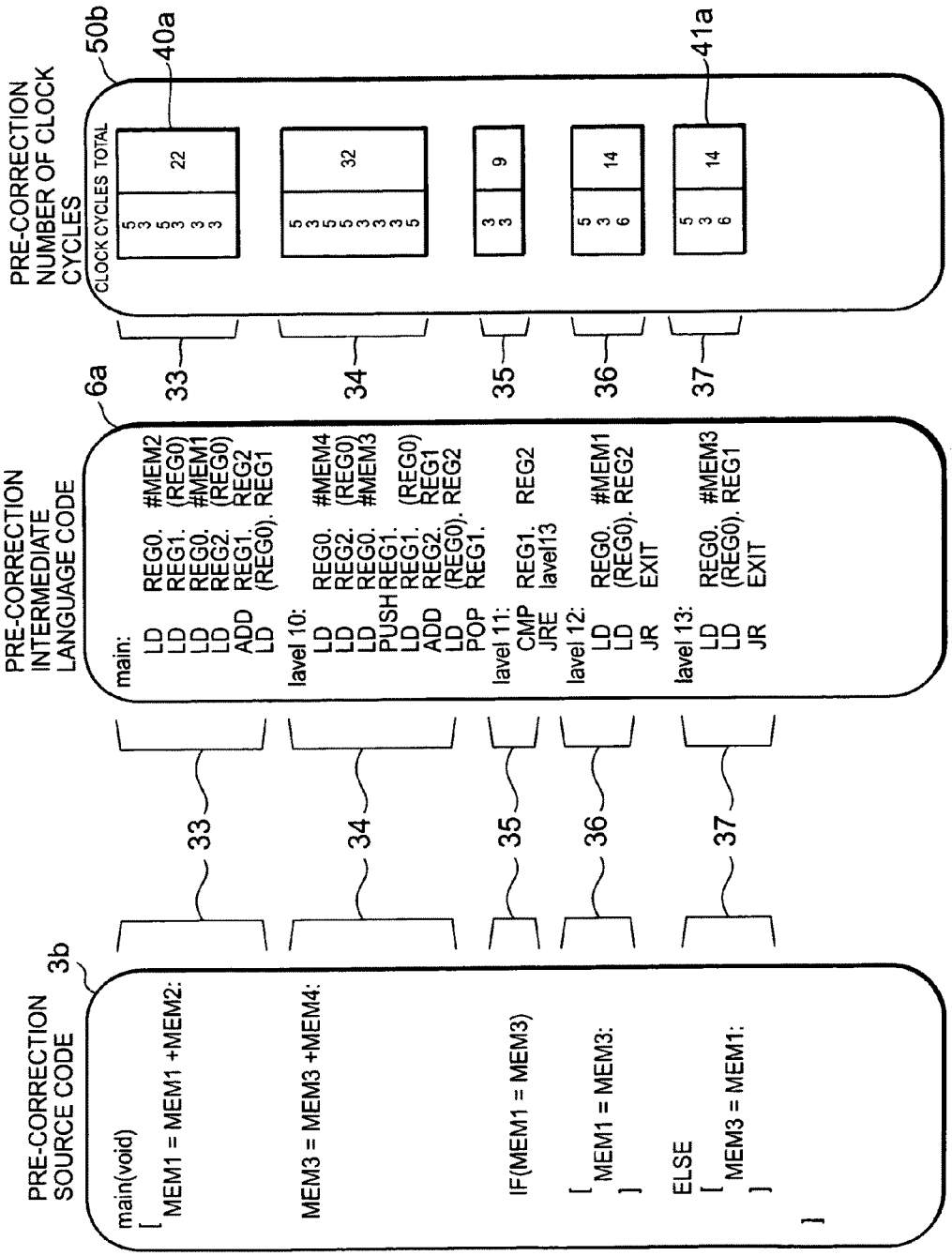
FIG. 11 is a diagram showing an example of a high level language source code before program correction, and an intermediate language code before program correction.
Figure 12:
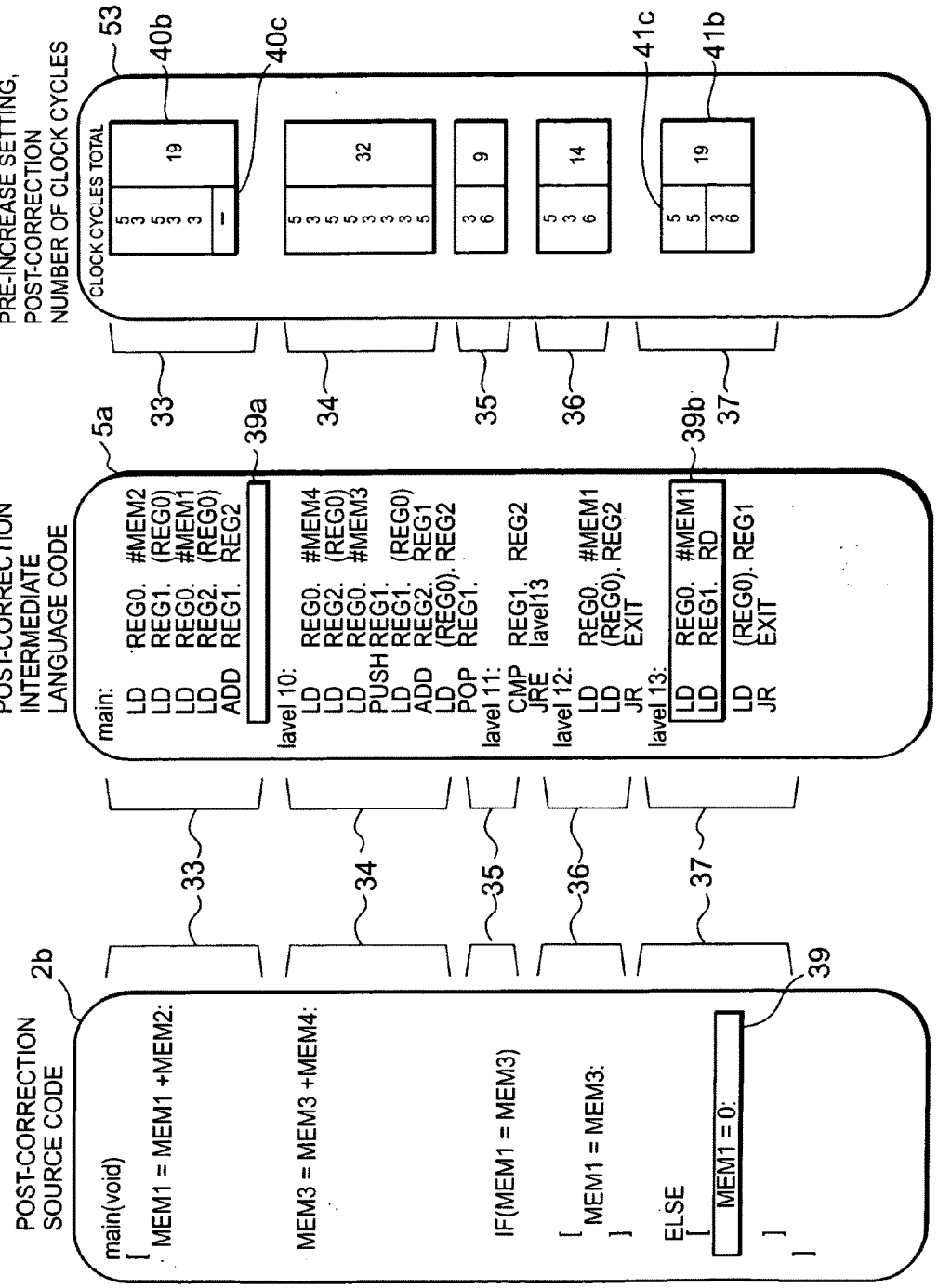
FIG. 12 is a diagram showing a high level language source code after program correction, and an intermediate language code after program correction.

FIG. 11 and FIG. 12 show the difference in the number of clock cycles before and after correction in the second exemplary embodiment of the invention. Specifically, FIGS. 11 and 12 show the cases where the program number of clock cycles of the post-correction program has increased or decreased as compared with the pre-correction program.

In the second exemplary embodiment of the invention, the post-correction source code 2b of FIG. 12 is obtained by applying a program correction 39 of FIG. 12 to the block 37 of the pre-correction source code 3b of FIG. 11. The blocks 33 to 37 of FIGS. 11 and 12 are instruction sets corresponding to the pre-correction source code 3b and post-correction source code 2b.

The compiler 1b of the second exemplary embodiment of the invention generates the post-correction intermediate language code 5a of FIG. 12 from the post-correction source code 2b. FIG. 12 shows that, due to the program correction 39, a modification has occurred in the post-correction intermediate language code 5a in the program correction 39a of the block 33, and the program correction 39b of the block 37. Specifically, the program correction 39a shows that one instruction was deleted, and the program correction 39b shows that one instruction was modified while one instruction was added.

FIG. 14 is a descriptive diagram showing the pre-correction machine language code 62, post-correction machine language code 63, and the number of clock cycles after increase setting. The pre-correction machine language code 62 is generated by converting the pre-correction intermediate language code 6a. Also, the post-correction machine language code 63 is generated by converting the post-correction intermediate language code 5a. Hereafter, the process whereby the post-correction machine language code 63 is generated from the post-correction intermediate language code 5a will be described focusing on the differences from the first exemplary embodiment of the invention.

First, the clock cycle count comparator 11 of FIG. 9 computes the pre-correction number of clock cycles 50b of FIG. 11 which is the number of clock cycles per instruction and instruction set, and the pre-increase/decrease setting, post-correction number of clock cycles 53 of FIG. 12, from the pre-correction intermediate language code 6a and post-correction intermediate language code 5a, and the number of clock cycles for each block are then compared.

Specifically, for the block 33, the pre-correction number of clock cycles 40a of FIG. 11 (22) is compared with the post-correction number of clock cycles 40b of FIG. 12 (19), so the difference is 3 clock cycles (40c). From this, it is seen that the block 33 has decreased as compared with prior to correction. Also, for the block 37, the pre-correction number of clock cycles 41a of FIG. 11 (14) is compared with the post-correction number of clock cycles 41b of FIG. 12 (19), so the difference is 5 clock cycles (41c). From this, it is seen that the block 37 has increased as compared with the value prior to correction. Specifically, for the post-correction intermediate language code 5a, the program numbers of clock cycles of the blocks 33 and 37 have changed as compared with the pre-correction intermediate language code 6a, so it is necessary to adjust the control timing.

The clock cycle count increase/decrease setting part 12b of FIG. 9 determines information specifying the number of clock cycles according to the difference in the number of clock cycles calculated by the clock cycle count comparator 11 for each block. Here, since the block 33 has decreased by 3 clock cycles, to reduce the difference, the number of clock cycles is increased by 3 for the instructions of the block 33. Similarly, since the block 37 has increased by 5 clock cycles, to reduce the difference, the number of clock cycles is decreased by 4 for the instructions of the block 37. Hence, the clock cycle count increase/decrease setting part 12b notifies the machine language code converter 13 taking an increase of one clock cycle for each of the three instructions of the block 33, and a decrease of one clock cycle for each of the four instructions of the block 37, as information specifying the number of clock cycles.

Next, the machine language code generator 13 of FIG. 9 converts the instructions of the post-correction intermediate language code 5a into machine language instructions. In the machine language code generator 13, +1 clock cycle is set by the clock cycle count increase/decrease specification part 63a in the three instructions of the block 33 (FIG. 14), respectively, and −1 clock cycle is set by the clock cycle count increase/decrease specification part 63b in the four instructions of the block 37 (FIG. 14), respectively, based on information specifying the number of clock cycles defined by the clock cycle count increase/decrease setting part 12b.

Specifically, the $2^{nd}$ line, the 4th line, and the $5^{th}$ line of the clock cycle count increase/decrease specification part 63a, are 01. Similarly, the $1^{st}$ line to the $4^{th}$ line of the clock cycle count increase/decrease specification part 63b are 11. In this way, the post-correction machine language code 63 is generated by the compiler 1b. The number of clock cycles of the post-correction machine language code 63 when it is executed by the microcomputer 7b, is the post-correction number of clock cycles 54 after increase setting (FIG. 14).

In the pre-correction machine language code 62 generated from the pre-correction source code 3b by a prior art compiler, the numbers of clock cycles of the blocks 33 and 37 are 19 and 19, respectively (40b, 41b of FIG. 12).

However, in the post-correction machine language code 63 generated from the post-correction source code 2b by the compiler 1b according to the second exemplary embodiment of the invention, since the number of clock cycles are increased and decreased as mentioned above, the block 33 of the post-increase/decrease setting, post-correction number of clock cycles 54 of FIG. 14 is 22 as with the pre-correction machine language code 62, and the block 37 of the post-increase/decrease setting, post-correction number of clock cycles 54 is generated as an instruction executed by one more clock cycle than the pre-correction machine language code 62, i.e., 15 clocks (40d, 41d of FIG. 14). Due to this, although the number of machine language instructions may have decreased in the block 33, by having the clock cycle count increase specification part 63a set an increased value corresponding to the clock cycle count increase specification part 62a, the number of clock cycles (40d) can be made identical to the pre-correction number of clock cycles 40a. Or, although the number of machine language instructions may have increased in the block 33, by having the clock cycle count increase specification part 63b set a decreased value corresponding to the clock cycle count increase specification part 62b, the number of clock cycles (41d) can be made identical to the pre-correction number of clock cycles 41a. Therefore, the difference in the number of clock cycles can be suppressed to the minimum, and the control timing is adjusted.

The microcomputer 7b of the second exemplary embodiment executes the post-correction machine language code 63 which is an executable program, determines the clock cycle count increase/decrease specification of the clock cycle count increase/decrease specification part 83*a* in the clock cycle count increase/decrease determining part 22*b*, increases or decreases the number of clock cycles in the clock cycle count increase/decrease reflector part 19*b*, and executes the instructions.

The control timing adjustment technique disclosed by Patent document 1, which is assumed in the present invention, has some problems. The first of these is that the number of clock cycles cannot be adjusted in the decrease direction.

In Patent document 1, to equalize the number of clock cycles between the instruction sets of a program, dummy instructions are added to an insufficient instruction set. Therefore, when the number of clock cycles increases due to a program correction, adjustment must be made by increasing all the dummy instructions.

On the other hand, according to the second exemplary embodiment of the invention, the number of clock cycles can not only be increased, but also decreased, so it is possible to suppress a change of control timing even for a correction made for an increase in the program code, which was impossible in the prior art.

The second problem of Patent document 1 is that the system is complex and bulky. The third problem of Patent document 1 is that a correction by dynamic analysis may not converge.

In view of the above, according to the first and second exemplary embodiments of the invention, as compared with the prior art, the system can be simplified, the time required for adjustment is shortened, and a program that has been corrected can be obtained in a shorter time.

Further, by suppressing a change of control timing due to the effect of these changes on plural positions of a low level language due to a slight correction of a high level language, the development of fresh faults related to control timing can be prevented, and the number of steps that must be performed for re-verification due to control timing can be reduced, hence the number of development steps is reduced and quality is thereby improved.

Also, when an existing program is re-used, correction of control timing other than corrected positions is suppressed, so program reuse is more efficient.

According to the second exemplary embodiment of the invention, the number of clock cycles is decreased, so redundancy is given to a number of clock cycles corresponding to an instruction beforehand. For example, if a certain instruction is performed by 3 clock cycles, this is defined by the CPU in the microcomputer so that it may be performed with 5 clock cycles. A redundancy of 2 clock cycles is therefore given to the number of clock cycles. It might appear that giving redundancy to the number of clock cycles in this way would lead to a decrease of performance. However, with higher operation clock speeds of CPUs in recent years, this is not a factor which causes a large deterioration. On the contrary, the number of control timing verification steps in the inspection process of the present invention is reduced, which leads to an improvement in program development efficiency. It also promotes reuse of programs, such as the application of an existing program to another program, and this is a very large advantage.

Other Exemplary Embodiments

In the above-mentioned example, the case was described where the difference from a number of clock cycles of the corresponding instruction was set in the information specifying the number of clock cycles, but the invention is not limited thereto, and the number of clock cycles of the corresponding instruction after reflecting the difference may itself be set instead.

Also, in the above-mentioned example, the case was described where the information specifying the number of clock cycles was specified by 2 bits, but it may be expressed by any number of bits. For example, by increasing the number of bits, the width of the number of clock cycles which can be adjusted per instruction can be increased.

In the above-mentioned example, the position which stores information specifying a number of clock cycles (clock cycle count specification area) was defined as being situated after the instruction part 82 in the operation code part 80 of one machine language instruction, but the clock cycle count specification area may be situated before the instruction part 82 or outside the operation code part.

The clock cycle count specification area was defined as being within one machine language instruction, but instead of the clock cycle count specification being within one machine language instruction, a dedicated specification area may be defined separately therefor.

In the above-mentioned example, the clock cycle count specification area was defined within the machine language code by the compiler 1, compiler 1*a*, and compiler 1*b*. However, the number of clock cycles may be adjusted also by adding dummy instructions not using the clock cycle count specification area of the machine language code.

It will be understood that the present invention is not limited to the aforesaid embodiments, and that various corrections are possible to the extent that they do not depart from the scope and spirit of the invention as outlined above.

Further, it is noted that Applicant's intent is to encompass equivalents of all claim elements, even if amended later during prosecution.

What is claimed is:

1. A method of adjusting a control timing accompanying a program correction of a machine language program executed by an information processor, comprising:
preparing a first machine language program obtained by compiling a first source program;
generating a second intermediate language program from a second source program, the second source program being corrected from the first source program;
computing a first number of clock cycles, that is a number of clock cycles to execute the first machine language program;
computing a second number of clock cycles, that is a number of clock cycles to execute a second machine language program obtained by compiling the second source program, using the second intermediate language program, the second intermediate language program including an instruction that is uniquely correlated with a machine language instruction of the second machine language program;
comparing the second number of clock cycles with the first number of clock cycles; and
adjusting the second machine language program by performing at least one of addition, deletion and modification of the second machine language program to reduce a difference between the first number of clock cycles and second number of clock cycles, based on the second intermediate language program.

2. The method according to claim 1, wherein the second number of clock cycles is computed using a first intermediate language program generated from the first source program, and the first intermediate language program includes an instruction that is uniquely correlated with the machine language instruction of the first machine language program.

3. The method according to claim 2, wherein the comparison of the first number of clock cycles and second number of clock cycles is performed for each instruction of the first intermediate language program and the second intermediate language program, or for each instruction set which is a group of plural instructions thereof.

4. The method according to claim 1, wherein the machine language instruction contains an information specifying the number of clock cycles used to control the number of clock cycles of the corresponding machine language instruction in the information processor.

5. The method according to claim 4, wherein the information processor determines a number of clock cycles which should execute the machine language instruction from the information specifying the number of clock cycles, and executes the machine language instruction based on the determined number of clock cycles.

6. The method according to claim 5,
wherein the information specifying the number of clock cycles comprises an information showing an increase or decrease of the number of clock cycles of the machine language instruction; and wherein the information processor reflects the information specifying the number of clock cycles in the number of clock cycles of the machine language instruction.

* * * * *